US006422350B1

(12) United States Patent
Erker

(10) Patent No.: US 6,422,350 B1
(45) Date of Patent: Jul. 23, 2002

(54) MONITORING DEVICE FOR DRIVE EQUIPMENT FOR ELEVATORS

(75) Inventor: Hubert Erker, Gingen (DE)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 09/677,253

(22) Filed: Oct. 2, 2000

(30) Foreign Application Priority Data

Oct. 1, 1999 (EP) ........................................... 99810888

(51) Int. Cl.[7] .............................. B66B 1/34; H02H 5/00

(52) U.S. Cl. ........................ 187/277; 187/289; 187/393

(58) Field of Search ................................ 187/277–299, 187/391–394; 318/565, 434; 361/23–34

(56) References Cited

U.S. PATENT DOCUMENTS 4,457,404 A * 7/1984 Husson et al. .............. 187/277
5,276,292 A * 1/1994 Goto et al. ............. 187/393 X
5,549,179 A * 8/1996 Herkel et al. ........... 187/391 X
5,765,664 A * 6/1998 Herkel et al. ............... 187/393
6,056,088 A 5/2000 Gerstenkorn
6,108,179 A * 8/2000 Katae et al. .................. 361/31

FOREIGN PATENT DOCUMENTS

| | | |
|---|---|---|
| EP | 0 767 133 | 4/1997 |
| EP | 0 903 314 | 3/1999 |
| JP | 10245713 | 9/1998 |

* cited by examiner

*Primary Examiner*—Stanley J. Witkowski
(74) *Attorney, Agent, or Firm*—MacMillan, Sobanski & Todd, LLC

(57) ABSTRACT

A definite switching-off of drive equipment for elevators is accomplished with a control at an input side external of a frequency changer power unit that ascertains the presence or the absence of monitoring signals which are derived from the mains voltage at the input of the frequency changer power unit. Upon ascertaining the presence of one or more such signals when the drive is at standstill, the input side control interrupts the energy flow to the frequency changer power unit by generating a switching-off signal to a switching device to disconnect the mains voltage.

14 Claims, 7 Drawing Sheets

MONITORING DEVICE FOR DRIVE EQUIPMENT FOR ELEVATORS

BACKGROUND OF THE INVENTION

The present invention relates to a monitoring device for drive equipment for elevators. In particular, the present invention relates to a device that monitors the standstill mode of the drive after shutdown thereof.

In drive equipment for elevators with a feed and control of three-phase or direct current electric motors, the requirement to be fulfilled for the case of shutdown of the drive and monitoring of the standstill of the same is that there should be measures defined by static means. These measures are described in, for example, European Standard EN 81-1 of 1998 under 12.7. Requirements with respect to fault examination and safety devices are described in, for example, European Standard EN 81-1 of 1998 under 14.1.

An example of a monitoring device for a drive control for elevators is disclosed in European patent document EP 0 903 314 A1. This monitoring device essentially consists of a safety sensor and motor circuit and/or brake circuit and the monitoring is carried out by means of electronic components.

In particular, a monitoring device 101 with a motor-and-brake circuit 103 is connected to a drive motor 105 and a brake 106 as shown in FIG. 3 of the EP 0 903 314 A1 document, which corresponds with FIG. 6 of the present application. Schematically illustrated in addition is a safety circuit 104 with a signal source 110 as well as a safety sensor system 102 with a connection 120 to the motor-and-brake circuit 103.

The motor-and-brake circuit 103 basically consists of a frequency changer power unit 150, a VVVF drive/control unit 151 (wherein VVVF signifies variable voltage and variable frequency), an intelligent protection system 152 and a brake control 153.

The frequency changer power unit 150 contains all electronic power components in order to transform the mains voltage into an intermediate circuit direct voltage and from that into the three-phase current for the drive motor 105. The VVVF drive/control unit 151 is the combination of the components for drive regulation and elevator control. The VVVF drive/control unit 151 controls the frequency changer power unit 150 and is on the other hand addressed by the intelligent protection system 152 as an interface. The intelligent protection system 152 is the safety module of the electronic drive. It consists of an electronic safety circuit and monitors all functions relevant to safety.

Moreover, FIG. 4 of the EP 0 903 314 A1 document, which corresponds to FIG. 7 of the present application, shows a motor control. The interface between the VVVF drive/control unit 151 and the intelligent protection system 152 is very simple without electromechanical relays. The energy flow, which forms the three-phase current, to the drive motor 105 can be blocked and applied through two switching elements, namely an input direct current rectifier 155 and an IGBT alternating current rectifier 156, by the intelligent protection system 152 via the VVVF drive/control unit 151. The input direct current rectifier 155 is fed by three phases L1, L2, L3 of alternating current electrical power and consists of a half thyristor bridge with a direct current rectifier control 157. The input direct current rectifier 155 can be switched on and off by the direct current rectifier control 157. When it is switched off, a small current flows through a charging resistor $R_C$. Control signals T1 to T6 of a pulse width modulation PWM for drive control of the IGBT's of the alternating current rectifier 156 are checked and gated as a block by the intelligent protection system 152 via a logical linking in the VVVF drive/control unit 151.

Measurement signals of the motor current iU, iV, and iW are prepared by the VVVF drive/control unit 151 and passed on to the intelligent protection system 152. The monitoring function is roughly subdivided into the sequences "start", "run" and "stop" of the drive for an elevator. The "stop" sequence follows an intermediate circuit voltage test of interest here. In that case, according to the frequency changer power unit 150 shown in FIG. 7 an intermediate circuit capacitor C, controlled by the components TB and RB of the VVVF drive/control unit 151, is discharged to such an extent that the intelligent protection system 152 can establish on the basis of an intermediate circuit voltage UZK whether the input direct current rectifier 155 is switched off. The drive is thereafter freed for a specific time minutes or hours) for a fresh start. If this time is exceeded, a new intermediate circuit voltage test has to be performed.

In this intermediate circuit voltage test a discharging of the capacitor C by way of TB and RB is necessary for the purpose of establishing whether the input direct current rectifier 155 is switched off. The capacitor has to be changed again later for the normal operation of the elevator. According to this state of the art circuit, an additional circuit connected downstream of the input direct current rectifier 155 is thus required by reason of the intermediate circuit lowering needed for the test.

SUMMARY OF THE INVENTION

The present invention has an object of creating a monitoring device by which it can be ascertained, without a large additional circuit, whether switching-off of the drive equipment for an elevator definitely has taken place.

In particular, according to the present invention, the ascertaining of a definite switching-off of the drive equipment is performed by a control on the input side externally of the frequency changer power unit. The input side circuit ascertains the presence or the absence of monitoring signals, which are derived from the multi-phase mains voltage, at the input of the frequency changer power unit or the static transformer. Upon ascertaining the presence of such a signal, the input side control can interrupt the energy flow to the frequency changer power unit by generating one or more switching-off signals to a switching device.

As the control device for monitoring a definite switching-off of the drive equipment is arranged at the input of the frequency changer power unit and not, as in the prior art monitoring devices, between the direct current rectifier and the alternating current rectifier, a measuring of the intermediate circuit direct voltage is superfluous. Thus, a charging and discharging of a capacitor is, according to the invention, redundant. Moreover, the device of the present invention is, due to the arrangement at the input of the frequency changer power unit, usable in a more flexible manner than the device for measuring the intermediate circuit direct voltage according to the prior art.

Further, according to the present invention preferably all three phases of the mains voltage can be individually monitored and selectively switched off. The check for an energy-free circuit can thereby be made without energy having to be applied for that purpose.

According to one embodiment, the switching device at the input of the frequency changer power unit comprises three single-phase relays with respective relay answering-back to the control at the input side.

According to a further embodiment the switching device at the input of the frequency changer power unit comprises three intrinsically safe semiconductor relays with signaling outputs for answering-back to the control at the input side.

According to another embodiment the switching device at the input of the frequency changer power unit is integrated with and the frequency changer power unit at the input is constructed as an active B6 bridge. A sensor provided in each branch of the bridge reports the signal state in the respective bridge branch to the control at the input side. In that case, the sensor provided in each branch of the bridge is preferably a current sensor, which is, for example, a Hall sensor or a current measuring coil.

The control, to which the measured signal states are delivered, at the input side is preferably the elevator control.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
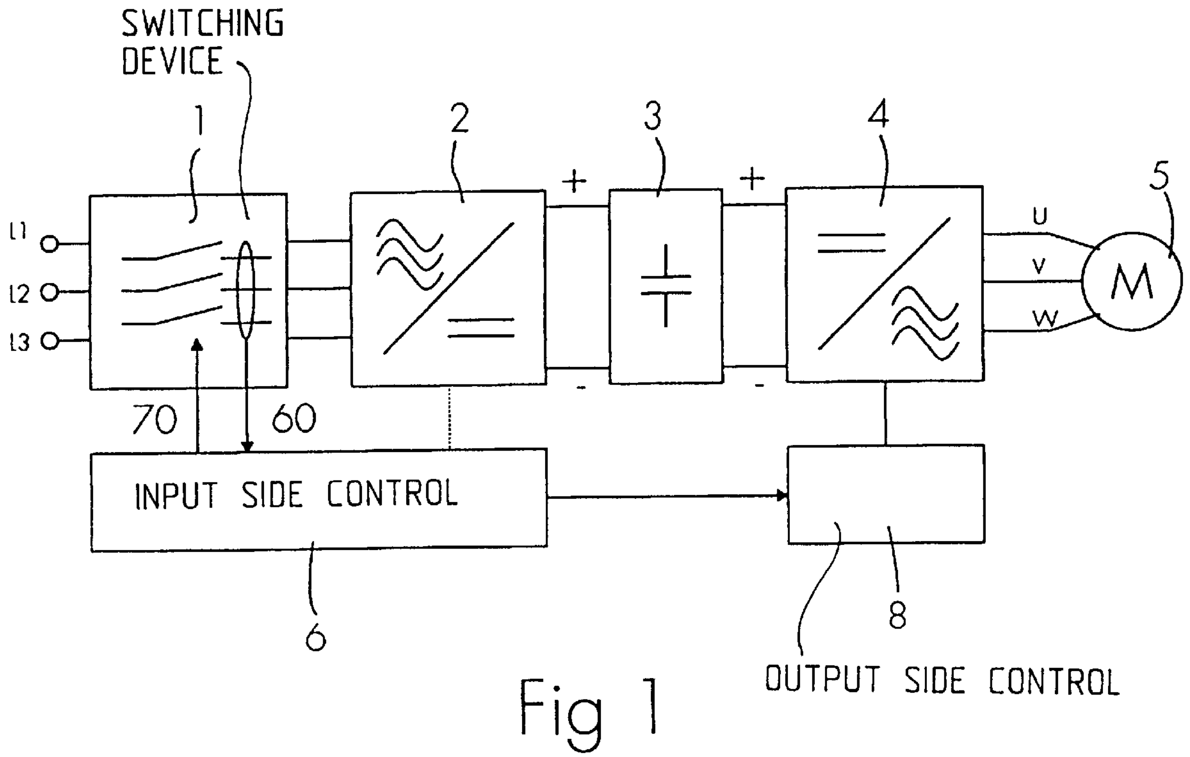
FIG. 1 is a block diagram of drive equipment for an elevator with a monitoring device according to the present invention.

FIG. 1 shows a block circuit diagram of drive equipment for an elevator with a monitoring device according to the present invention. A three-phase mains alternating current source (not shown) applies voltages L1, L2 and L3 to inputs of a switching device 1 that can switch on or off the energy flow to a downstream intermediate circuit 2, 3, which converts the three-phase mains voltages L1, L2 and L3 into an intermediate circuit direct voltage. The intermediate circuit 2, 3 consists of a frequency changer power unit or a static transformer 2 and an intermediate circuit capacitor 3. When the energy flow is switched on, the energy flows into the frequency changer power unit 2 and from the intermediate circuit capacitor 3 onward to an alternating current rectifier or frequency transformer 4 or a similar circuit for converting the intermediate circuit direct voltage into three-phase current U, V and W for a drive motor 5. The devices 2, 3 and 4 form a power supply unit having an input connected to the mains voltage source through the switching device I and an output connected to the drive motor 5.

Moreover, there are shown in FIG. 1 an input side control 6 connected at the input side of the power supply apparatus and, independently thereof, an output side control or VVVF control 8 connected at the output side of the power supply apparatus.

According to FIG. 1, monitoring signals 60 which indicate the presence or the absence of the mains voltages L1, L2 and L3, at the input of the frequency changer power unit 2, are in accordance with the invention fed to the input side control 6. The control 6 is arranged externally of the frequency changer power unit 2 and which in the case of the presence of the signal 60 can issue a switching-off signal 70 to the switching device 1 so as to cause a switching-off of the mains voltages L1, L2 and L3. The checking for a presence or an absence of mains voltages L1, L2 and L3 can be undertaken separately for all three phases, so that a selective switching-off is possible. The possibility of an energy-free circuit can thereby be investigated without energy for that purpose having to be made available. The feed of the signals 60 to the control 6 can be made by the switching device 1 (arrow with solid line) or by the frequency changer power unit 2 (dotted line), as will be more clear in the following descriptions of the first preferred embodiment and the second preferred embodiment or the third preferred embodiment.

Figure 2:
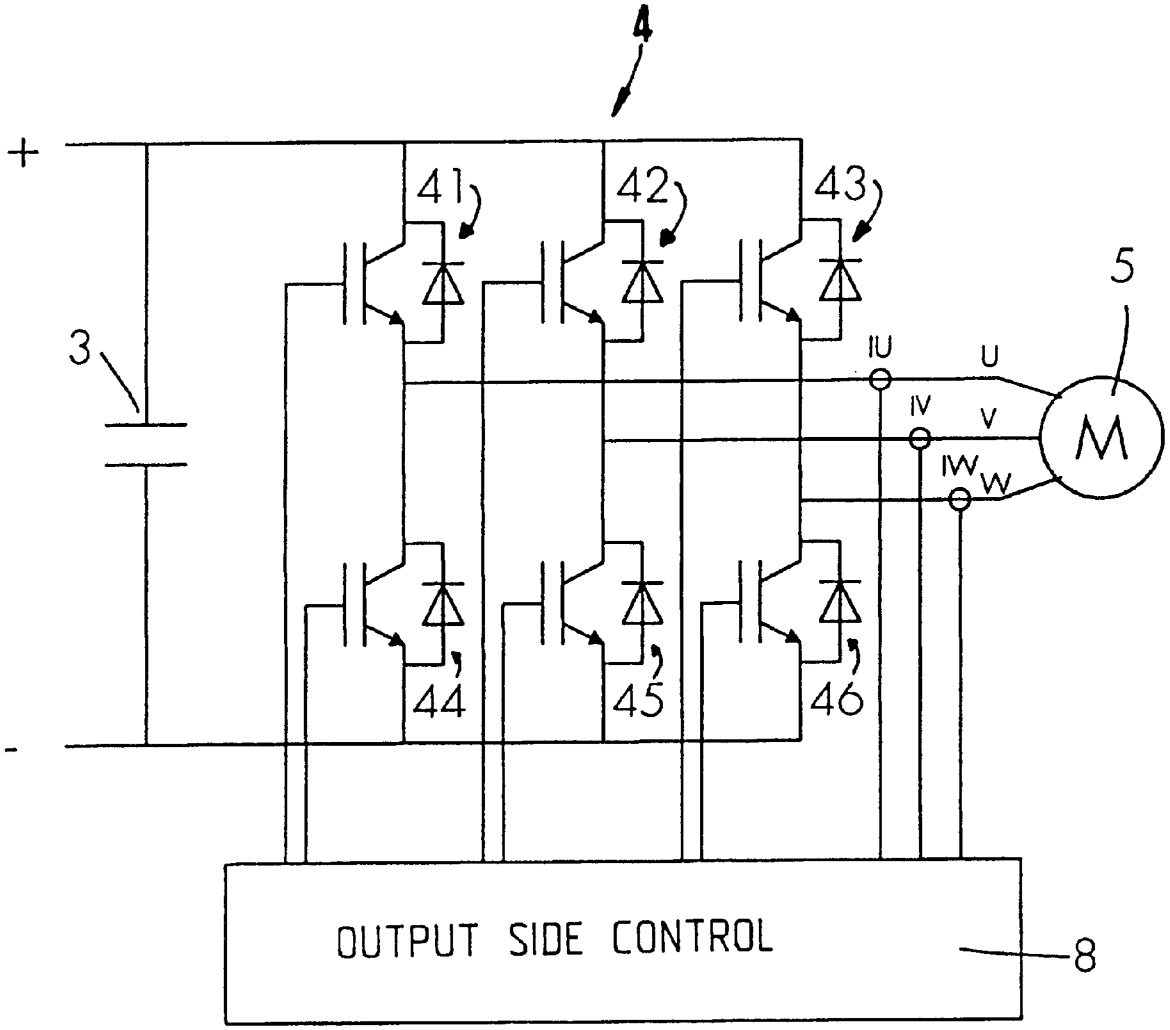
FIG. 2 is schematic diagram of a control at the output side of the drive equipment shown in FIG. 1.

The input side control 6 is connected with the output side control 8. The output side control 8, which is shown in FIG. 2, by way of example is a VVVF control known from the above-described prior art, such that an explanatory description is omitted here. The control 8 controls or regulates the frequency transformer 4 being connected to a plurality of solid state switches 41 through 46.

Figure 3:
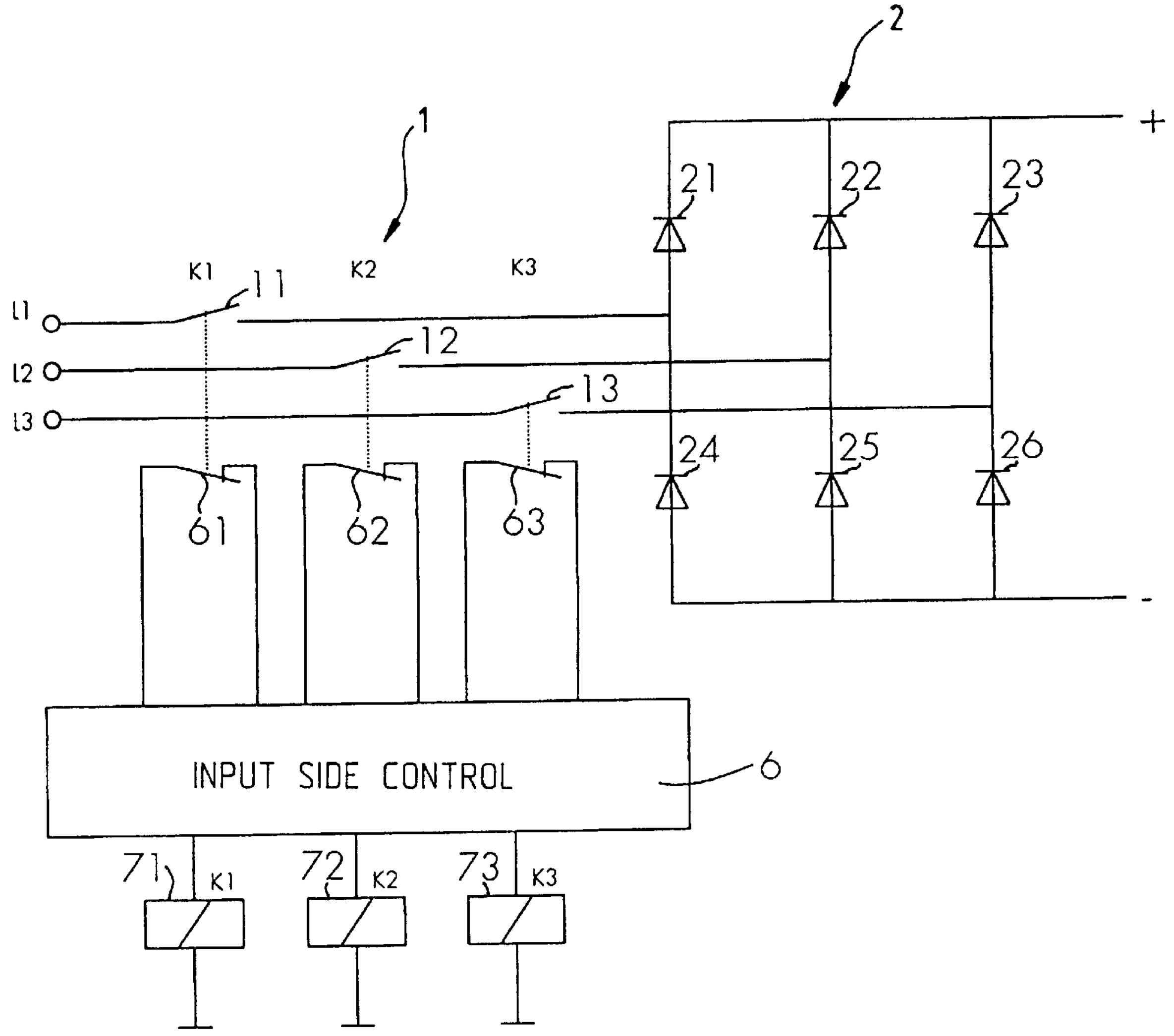
FIG. 3 is a schematic diagram of a first embodiment of the monitoring device according to the present invention.

In FIG. 3, there is shown the frequency changer power unit 2 as a plurality of direct current rectifier diodes 21 to 26 in a bridge circuit (a B6 bridge). As a first preferred embodiment, the switching device 1 has single-phase relays 11, 12 and 13 with respective relay answering-back 61, 62 and 63 to generate the monitoring signals 60 to the input side control 6, wherein the drive control of the single-phase relays 11, 12 and 13 is performed by relay coils 71, 72 and 73 responding to the switching-off signals.

Figure 4:
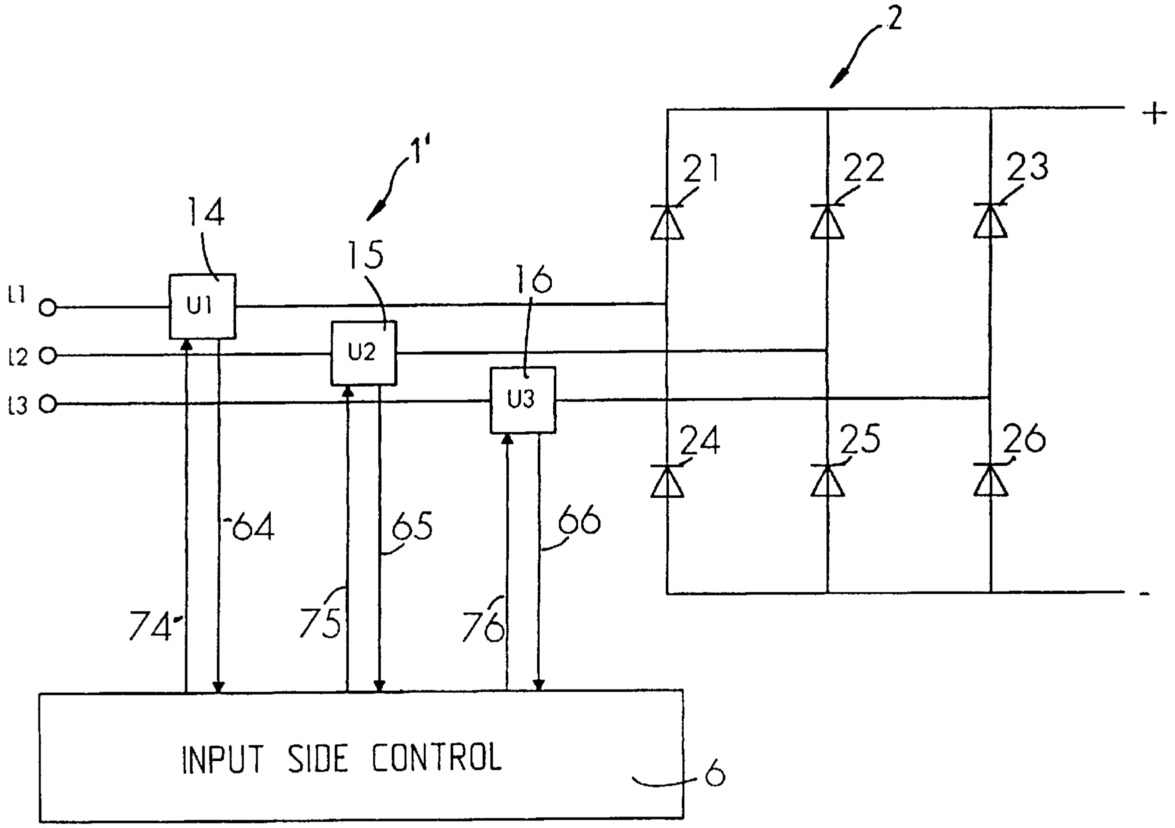
FIG. 4 is a schematic diagram of a second preferred embodiment of the monitoring device according to the present invention.

In FIG. 4, there is shown the frequency changer power unit 2 also with direct current rectifier diodes 21 to 26 in a bridge circuit (B6 bridge). As a second preferred embodiment, a switching device 1' with intrinsically safe semiconductor relays 14, 15 and 16 has fault reporting outputs 64, 65 and 66 for answering-back to the input side control 6 with the monitoring signals 60, wherein the drive control of the semiconductor relays 14, 15 and 16 is shown by switching-off signal lines 74, 75 and 76.

Figure 5:
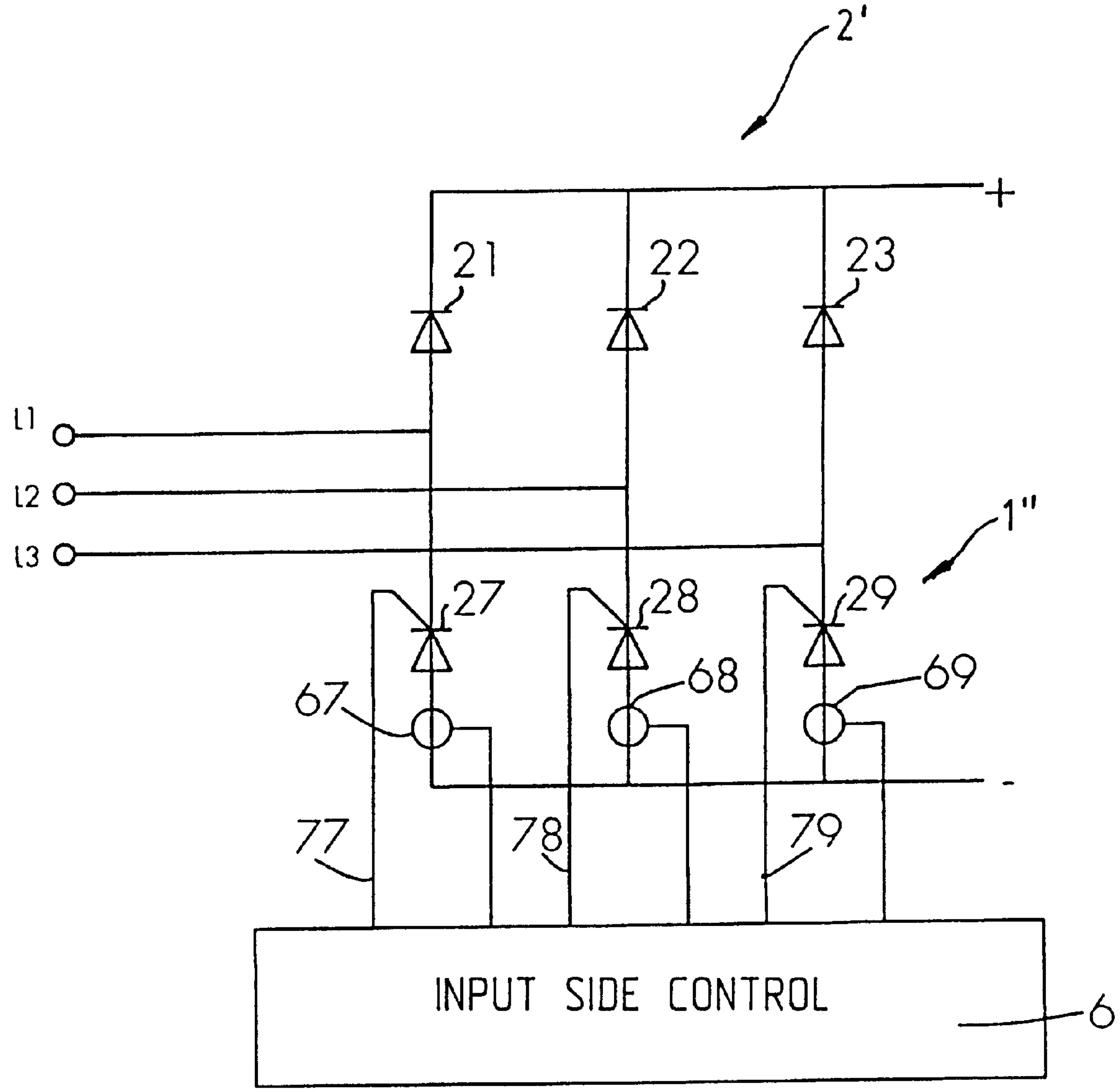
FIG. 5 is a schematic diagram of a third preferred embodiment of the monitoring device according to the present invention.
Figure 6:
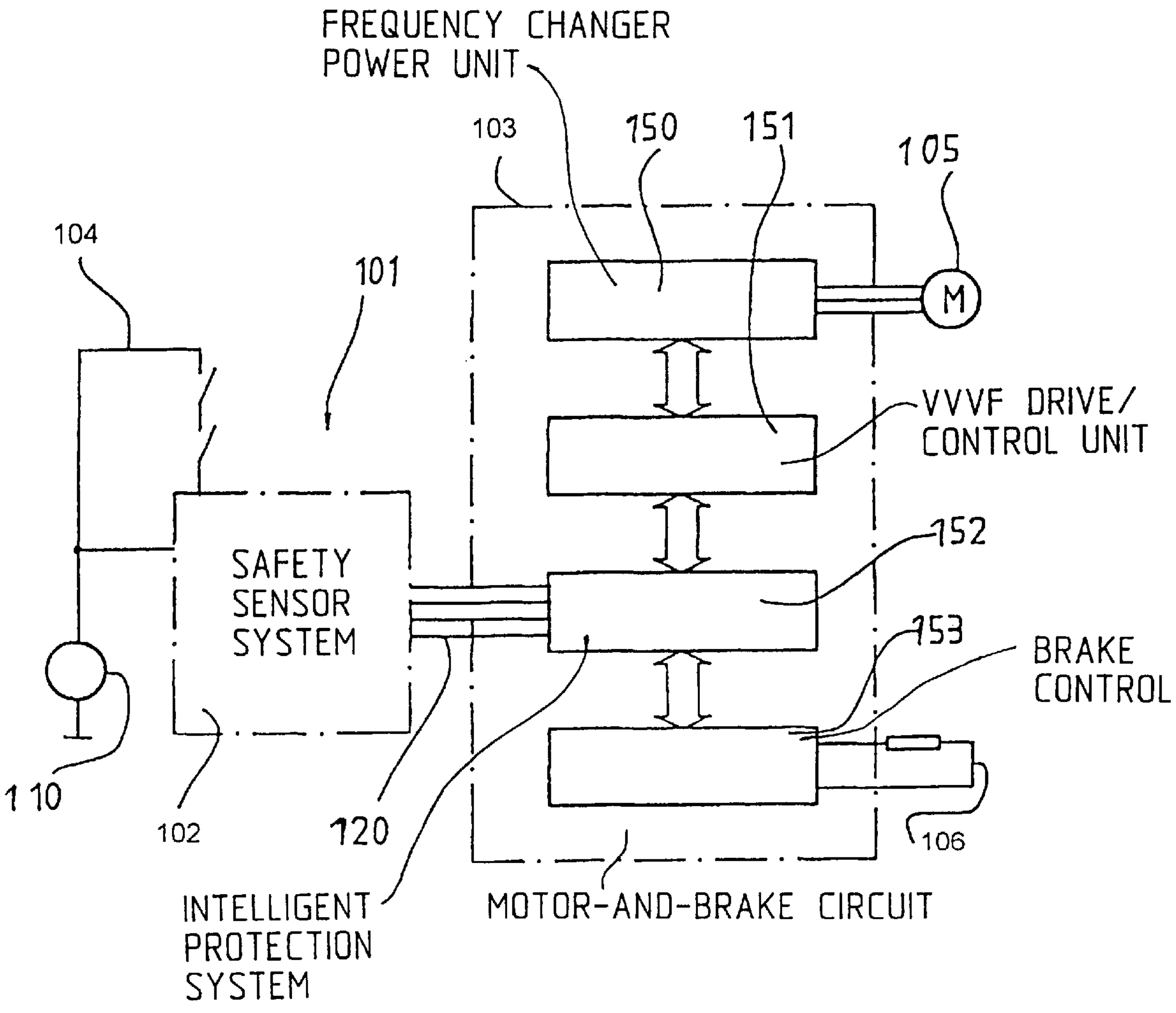
Fig. 6 PRIOR ART
FIG. 6 is a schematic illustration of a prior art motor-and-brake circuit switching circuit.
Figure 7:
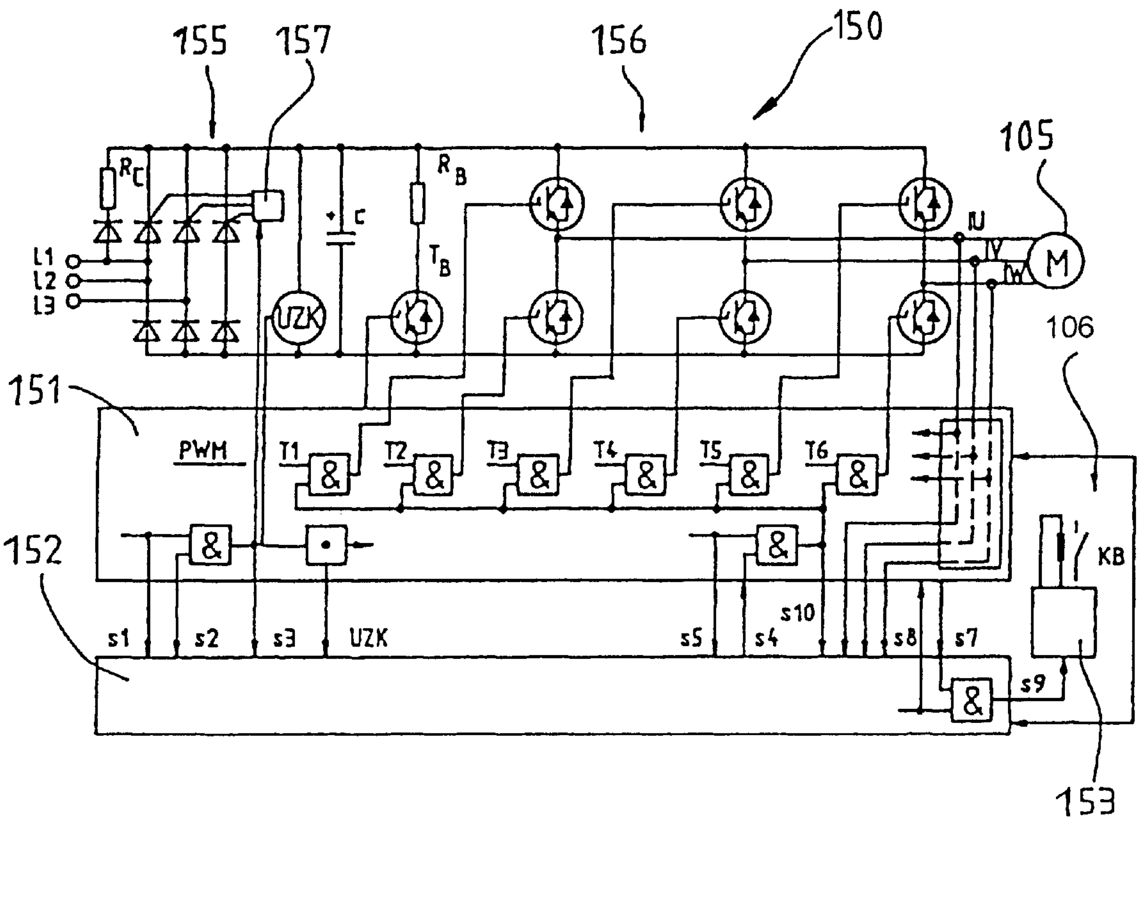
Fig. 7 PRIOR ART
FIG. 7 is a detailed schematic of the prior art motor control with a monitoring device shown in FIG. 6.

In FIG. 5 there is shown a frequency changer power unit 2' with the direct current rectifier diodes 21 to 23 and a plurality of controlled direct current rectifiers 27 to 29 in a bridge circuit (B6 bridge). In a departure from the circuits shown in the FIGS. 3 and 4, the direct current rectifiers 24, 25 and 26 are replaced by the controlled direct current rectifiers 27, 28 and 29. The controlled direct current rectifiers 27, 28 and 29 form a switching device 1" and are controlled respectively by switching-off signal lines 77, 78 and 79 from the input side control 6. Provided in each bridge branch of the frequency changer power unit 2' are sensors 67, 68 and 69, which sensors are constructed in such a manner that they generate the monitoring signals 60 to the input side control 6 as a respective signal state of the bridge branch in which they are provided. The sensors 67, 68 and 69 are, in that case, preferably current sensors such as, for example, Hall sensors or current measuring coils.

A monitoring according to the invention in all preferred embodiments takes place, in particular, in the closed or switched-on state of the switching devices 1, 1' or 1" whereby the prior art problem of a continual charging and discharging of the intermediate circuit of the static transformer is eliminated. The direct current rectifiers of the static transformers 2 and 2' operate in a bridge circuit B6 bridge, as shown in the FIGS. 3 to 5. If a bridge branch is now switched off, a B4 bridge is still available for the direct current rectification. The B4 bridge has sufficiently strong output power to maintain the intermediate circuit 2, 3 for permanent drive. The three bridge branches, and thus the drive equipment, are successively switched off in each standstill phase of the elevator. The switching-off of each branch can and must be separately monitored. The switching device 1, 1' or 1" is checked after each travel of the elevator car for the functional capability of an all-pole switching-off according to the standard EN 81-1 of 1998 under 12.7 mentioned above.

The monitoring signals 60 generated to the input side control 6 are processed in the control, wherein the demands on fault examination and on safety devices according to the standard EN 81-1 of 1998 under 14.1 mentioned above are obviously taken into consideration.

For example, in the case of a fault in one of the three bridge branches, the other branches are activated and switched off. A new starting-up of the elevator is prevented. A defective branch also leads to no energy flow. The circuit remains inactive and no energy is applied to the drive or motor 5.

If a fault happens simultaneously in two of the three bridge branches, the energy flow by way of the frequency transformer 4 can still be interrupted by reporting to the output side control (VVVF) 8, so that no energy is applied to the drive or the motor 5.

If a fault simultaneously happens with exactly two of the six switches, then an energy flow does indeed arise, but this does not lead to a three-phase field in the drive and thus to any risk, as in this case the brake can keep the drive at standstill.

There is thus disclosed in the foregoing a development of a monitoring device for the drive equipment for elevators, which exhibits, in particular, the advantage that a charging or discharging of an intermediate circuit is eliminated and that a selective switching-off is possible.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for monitoring elevator drive equipment, the drive equipment including a switching device having an input for connection to a plural phase alternating current power source, an elevator drive motor and a power supply unit connected between the switching device and the drive motor for providing electrical power to the drive motor, comprising:

a monitoring means for sensing a condition representing current flow in an output of a switching device and in an input of a power supply unit connected to the switching device output; and an input side control having an input for receiving said monitoring signals generated by said monitoring means, and having an output for generating switching-off signals when an elevator drive motor connected to the power supply unit is in a standstill condition whereby when said output of said input side control is connected to the switching device, the switching device responds to said switching-off signals by disconnecting the switching device from the power supply unit.

2. The monitoring apparatus according to claim 1 including a separate one of said monitoring signals for each phase of an alternating current power source connected to the input of the switching device and a separate one of said switching-off signals corresponding to each of said monitoring signals wherein the switching device disconnects each of the phases in response to a corresponding one of said switching-off signals.

3. The monitoring apparatus according to claim 2 the switching device includes a single-phase relay for each of the power source phases and said monitoring means includes an answering-back means associated with each of the relays for generating said monitoring signals.

4. The monitoring apparatus according to claim 2 wherein the switching device includes an intrinsically safe semiconductor relay for each of the power source phases and said monitoring means includes a signaling output of each of the relays for generating said monitoring signals.

5. The monitoring apparatus according to claim 2 wherein the switching device includes controlled direct current rectifier diodes for each of the power source phase integrated with direct current rectifier diodes in an active bridge in the power supply unit and said monitoring means includes a sensor in each branch of the bridge for generating said monitoring signals.

6. The monitoring apparatus according to claim 5 wherein said sensors are current sensors.

7. The monitoring apparatus according to claim 6 wherein said current sensors are one of a Hall sensor and a current measuring coil.

8. The monitoring apparatus according to claim 1 wherein said input side control is included in an elevator control.

9. An elevator drive apparatus comprising:

a switching device having an input for connection to a plural phase alternating current power source and having an output and being responsive to switching-off signals for disconnecting said input from said output;

a power supply unit having an input connected to said switching device output and having an output for connection to an elevator drive motor;

a monitoring means connected to at least one of said switching device and said power supply unit for sensing a condition representing current flow in said switching device output and in said power supply unit input; and an input side control connected to said monitoring means and to said switching device for switching on and off said switching device, said input side control generating said switching-off signals in response to receiving monitoring signals when an elevator drive motor connected to said power supply unit is in a standstill condition.

10. The elevator drive apparatus according to claim 9 wherein said power supply unit includes one of frequency changer power unit and a static transformer connected to said switching device output.

11. The elevator drive apparatus according to claim 9 wherein said monitoring signals each represent an individual phase of power source at said switching device input and said input side control switches off said switching device by phase in response to corresponding ones of said monitoring signals.

12. The monitoring apparatus according to claim 11 wherein said switching device includes a single-phase relay for each of the power source phases and said monitoring means includes an answering-back means associated with each of the relays for generating said monitoring signals.

13. The monitoring apparatus according to claim 11 wherein said switching device includes an intrinsically safe semiconductor relay for each of the power source phases and said monitoring means includes a signaling output of each of the relays for generating said monitoring signals.

14. The monitoring apparatus according to claim 11 wherein said switching device includes controlled direct current rectifier diodes for each of the power source phase integrated with direct current rectifier diodes in an active bridge in said power supply unit and said monitoring means includes a sensor in each branch of said bridge for generating said monitoring signals.

* * * * *